(12) United States Patent
Kim

(10) Patent No.: US 10,844,250 B2
(45) Date of Patent: Nov. 24, 2020

(54) DISPLAY PROTECTING FILM WITHOUT BASE FILM

(71) Applicant: Kwang-Won Kim, Incheon (KR)

(72) Inventor: Kwang-Won Kim, Incheon (KR)

( * ) Notice: Subject to any disclaimer, the term of this patent is extended or adjusted under 35 U.S.C. 154(b) by 0 days.

(21) Appl. No.: 16/603,767

(22) PCT Filed: Apr. 5, 2018

(86) PCT No.: PCT/KR2018/004000
§ 371 (c)(1),
(2) Date: Oct. 8, 2019

(87) PCT Pub. No.: WO2018/190564
PCT Pub. Date: Oct. 18, 2018

(65) Prior Publication Data
US 2020/0115592 A1  Apr. 16, 2020

(30) Foreign Application Priority Data

Apr. 10, 2017  (KR) .......................... 10-2017-0045963

(51) Int. Cl.
*C09J 7/29* (2018.01)
*C09J 7/25* (2018.01)
(Continued)

(52) U.S. Cl.
CPC . *C09J 7/29* (2018.01); *C09J 7/25* (2018.01); *C09J 7/255* (2018.01); *C09J 7/38* (2018.01); *C09J 7/401* (2018.01); *G02B 1/04* (2013.01); *G02B 1/14* (2015.01); *C09J 2203/326* (2013.01); *C09J 2467/00* (2013.01); *C09J 2475/006* (2013.01); *C09J 2483/00* (2013.01); *C09J 2483/005* (2013.01)

(58) Field of Classification Search
None
See application file for complete search history.

(56) References Cited

FOREIGN PATENT DOCUMENTS

| JP | 2007-535777 A | 12/2007 |
| JP | 2016-522838 A | 8/2016 |

(Continued)

OTHER PUBLICATIONS

Machine_English_translation_KR_101725026_B1; Hwang, B.; Composition used for preparing hard coat film for protecting display panel; Apr. 7, 2017; EPO; whole document (Year: 2017).*

(Continued)

*Primary Examiner* — Tahseen Khan
(74) *Attorney, Agent, or Firm* — Michael J. Blessent; Bret E. Field; Bozicevic, Field & Francis LLP

(57) ABSTRACT

The present invention relates to a display protective film including no base film, and the display protective film includes a transparent coating layer and a surface-protective coating layer. The protective film of the present invention is attached to whole surfaces of a flat portion and a curved portion. Accordingly, there is no peeling phenomenon on the curved portion. The protective film is also excellent in preventing the breakage of glass due to impact and preventing contamination. Moreover, scratches that may occur in outdoor activities are restored, and indentation marks made by a stylus pen when writing with the stylus pen are immediately restored, so that a clean screen is always maintained.

11 Claims, 3 Drawing Sheets

(51) Int. Cl.
*C09J 7/38* (2018.01)
*C09J 7/40* (2018.01)
*G02B 1/14* (2015.01)
*G02B 1/04* (2006.01)

(56) References Cited

FOREIGN PATENT DOCUMENTS

| KR | 10-0672868 B1 | 1/2007 |
|---|---|---|
| KR | 10-0942311 B1 | 2/2010 |
| KR | 10-1122922 B1 | 3/2012 |
| KR | 10-2012-0122458 A | 11/2012 |
| KR | 10-2014-0106017 A | 9/2014 |
| KR | 10-1469082 B1 | 12/2014 |
| KR | 10-2015-0051913 A | 5/2015 |
| KR | 10-2016-0046133 A | 4/2016 |
| KR | 10-2016-0108088 A | 9/2016 |
| KR | 10-1717507 B1 | 3/2017 |
| KR | 101725026 B1 * | 4/2017 |

OTHER PUBLICATIONS

Decision to Grant a Patent for Korean Patent Application No. 9-5-2017-056038815, dated Aug. 10, 2017, and its English translation, 9 pages.

Office Action for Korean Patent Application No. 9-5-2017-035070425, dated May 19, 2017, and its English translation, 12 pages.

International Search Report for International Application No. PCT/KR2018/004000, dated Aug. 23, 2018, and its English translation, 5 pages.

Written Opinion for International Application No. PCT/KR2018/004000, dated Aug. 23, 2018, and its English translation, 8 pages.

* cited by examiner

[Fig. 1]
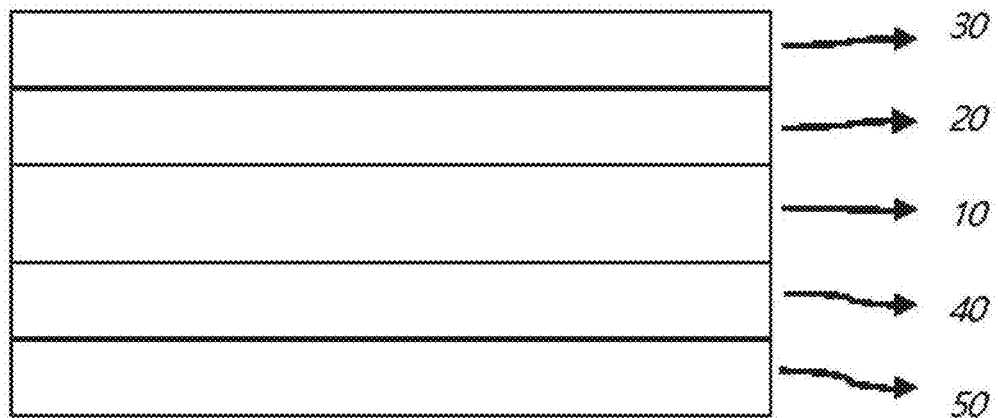
[Fig. 2a]
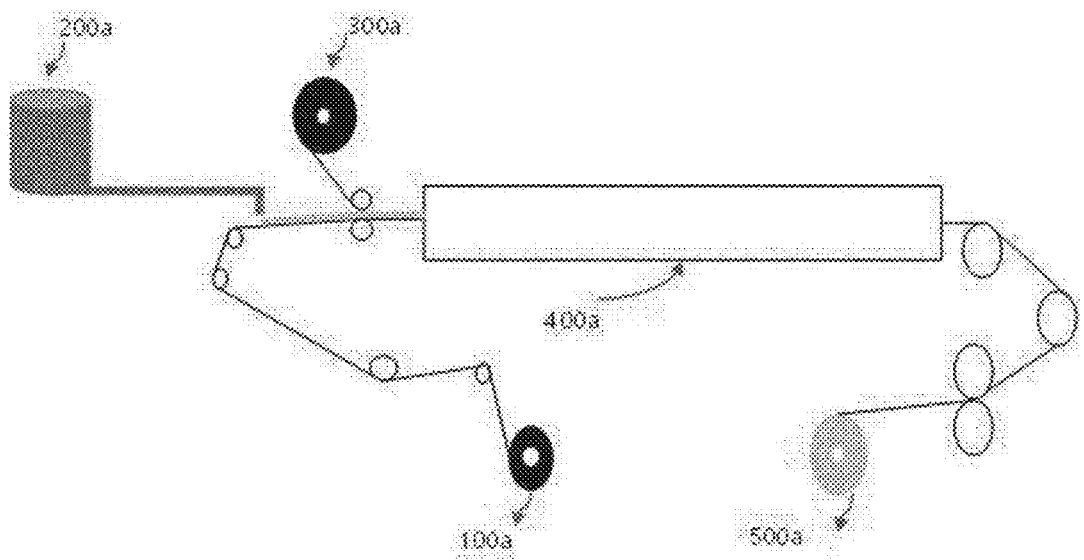

[Fig. 2b]
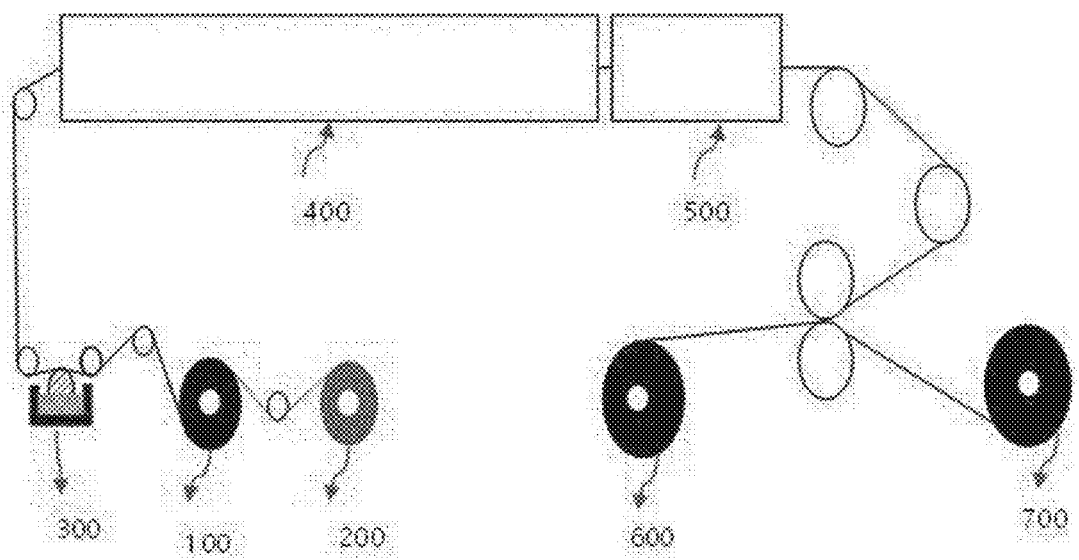

[Fig. 3a]
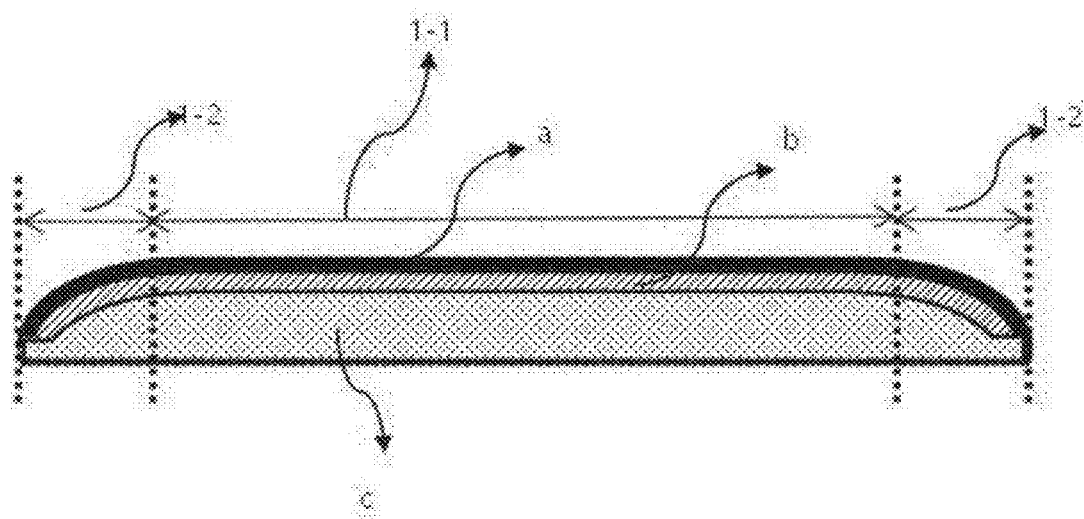
[Fig. 3b]
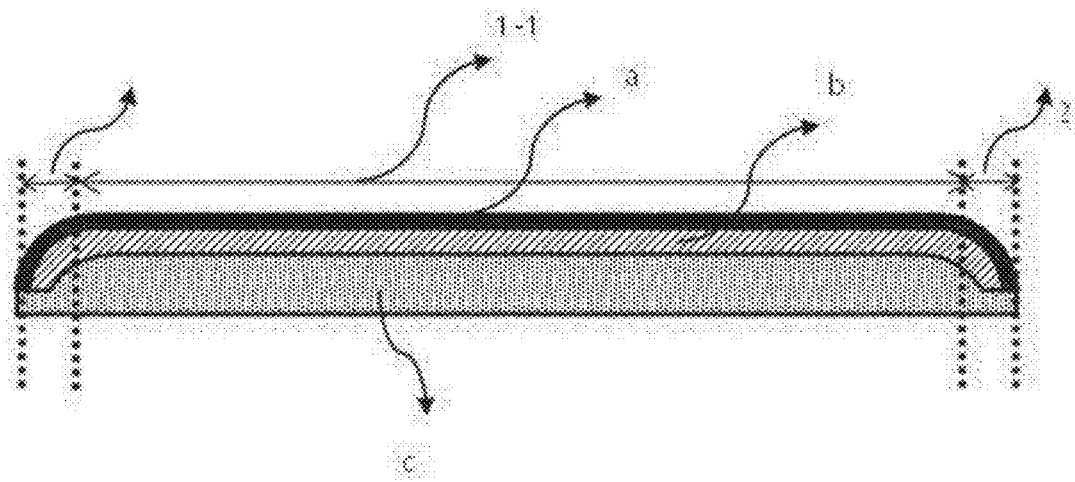

DISPLAY PROTECTING FILM WITHOUT BASE FILM

CROSS-REFERENCE TO RELATED APPLICATION

This Application is a Section 371 National Stage Application of International Application No. PCT/KR2018/004000, filed Apr. 5, 2018, the contents of which is hereby incorporated by reference in its entirety.

TECHNICAL FIELD

The present invention relates to a protective film for protecting a display screen, and more particularly to a protective film that is applicable to a display screen having a curved edge and does not include a base film layer.

BACKGROUND ART

Recently, the shape of displays of smartphones including the Galaxy S7, Galaxy S8, and iPhone 7, starting with Samsung's Galaxy S6 edge and Apple's iPhone 6, has gradually expanded beyond a flat surface, and the application of a touch-screen panel having curved edges on two or four sides has increased. In particular, the Galaxy S7 and Galaxy S8 series, which are Samsung's edge-display-type smartphones, have a relatively smooth R value of a curved shape and a large area of a curved portion. However, Apple's iPhone 7 series have a very small R value of a curved shape and a narrow curved portion. Accordingly, there is no product including a liquid-crystal-protective film that is capable of being attached to the entire curved portion. Even when the film needs to be attached to the curved portion, the film is attached only to a flat portion, but not to the curved portion, due to a peeling phenomenon, and there is no solution for impact breakage or scratching on the curved portion.

As technology for a display protection film, there is Korean Laid-Open Patent Application No. 10-2014-0106017. The protective film of the patent document is a liquid-crystal-protective film obtained by combining a PET film and a film including a TPU material. The hardness of the film is 95A or more, and a peeling phenomenon occurs at the curved edge thereof. Accordingly, it is impossible to attach the film to the curved edge of a curved display.

Further, Korean Patent No. 10-1469082 is a patent relating to a multilayered film for the injection of a curved display having a self-restoring function. In this technology, when a polycarbonate (PC) transparent resin is melted at a high temperature and then injected using IMD (In-Mold Decoration), which is a conventional industrial term, a multilayered film including a PET base film layer and a self-restoring layer is attached during PC injection, thus manufacturing a multilayered film-PC injection product. This is a technology that was applied to the method of manufacturing displays before the introduction of touch-type modules for smartphones in the manufacture of a screen portion using an injection method of plastics including PC applied to the screen of early models of mobile phones, that is, so-called feature phones, other than smartphones having a glass cover.

Such a protective film is not a liquid-crystal-protective film attached to the curved surface of the cover glass of the smartphone by a consumer in order to prevent the liquid crystal breakage or protect the surface thereof. Accordingly, it is impossible to apply the above-described multilayered film to the curved cover glass of smartphones.

Further, the protective film described in Korean Laid-Open Patent Application No. 10-2015-0051913 is based on a urethane film, which is a transparent base film, and includes a transparent resin layer and a silicone adhesive layer. The protective film is capable of being attached to a flat portion, but a peeling phenomenon occurs on a curved edge.

The protective film of Korean Laid-Open Patent Application No. 10-2016-0046133 includes a transparent base layer, that is, a PET film, and an adhesive layer. The protective film is manufactured using a forming method in which heating and pressing are forcibly and artificially applied. Although the protective film is manufactured using the forming process, after the protective film is attached to a curved edge, the attachment is maintained in early stages due to the hardness of the PET base, but as time goes by, there is a problem in that a peeling phenomenon slowly occurs on the curved portion due to the repulsive elasticity of the PET base.

The protective film disclosed in Korean Laid-Open Patent Application No. 10-2016-0108088 includes a film main body attached to a flat portion; and an edge portion, which is formed along the edge of the film main body, is attached such that a shape displacement corresponds to a curvature value of a curved portion, and includes a soft synthetic resin. The edge portion is manufactured using a soft synthetic resin material such as silicone, polyurethane, and sealant, and is attached and fixed to the edge of the film main body through molding, so that peeling and separation of the protective film from the curved portion of the edge after the protective film is attached are prevented.

However, in this method, the film main body is attached to the flat portion and the edge portion is attached to the curved portion through molding of a soft synthetic resin such as silicone, polyurethane, and sealant. Since two separate attachment processes are required, this method is inefficient, and the monetary burden on the consumer is increased. Further, there is a problem in appearance due to the difference in the material of the flat portion and the curved portion, and there is another problem in that, after attachment to the glass of a smartphone, continuous touch operation is inconvenient.

Korean Patent No. 10-1717507 discloses a composite protective sheet, which is stably attached to the curved portion of a mobile device having a curved portion while overcoming a springback phenomenon and which includes a multilayered base film, and a method of manufacturing the same. This technology is a technology for preventing a springback phenomenon by attaching a multilayered composite sheet to a flat portion and then reinforcing the curved portion with a heat-curable resin or a UV-curable resin or placing a band-portion-insertion-groove layer on a contact point between curved and flat surfaces. In this structure, a reinforcement layer including a heat-curable resin or a UV-curable resin is provided on the curved edge. In this technology, there is a problem in appearance due to the difference in the material of the flat portion and the curved portion during continuous use, and there is another problem in that continuous touch operation is inconvenient. Further, there is a problem in appearance due to the accumulation of foreign matter such as dust in groove gaps during continuous use and there is another problem of inconvenient continuous touch operation due to the constitution of the placement of the band-portion-insertion-groove layer on a contact point between the curved and flat surfaces so as to prevent the springback phenomenon.

Until now, in most conventional liquid-crystal-protective films, a polyester (PET) film having a high hardness of 1H to 2H is included as a base layer. When a hard coating product in which the surface of the above-described PET film base layer is coated with a coating layer having a hardness of 2H or more is attached to the curved surface of a display, the attachment to the curved surface is insufficient and a peeling phenomenon occurs, so the product is attached only to a flat portion, thus forming an appearance that is not aesthetically pleasing. In particular, since the curved edge is vulnerable to impact, consumer concern and dissatisfaction due to the repair cost for breakage of the liquid crystal glass are further increased.

In order to solve these problems, an attempt has been made to enable a liquid-crystal-protective film including a polyester (PET) film base having high hardness to have a curved surface through a forming process using heating and pressing. However, there is a problem in that the protective film is peeled because the curved surface is not maintained for a long period of time. There is another attempt to manufacture a film including TPU, which is thermoplastic polyurethane. However, since the hardness of the TPU film is high, namely 85A to 95A, a peeling phenomenon occurs on the curved portion due to the repulsive elasticity, and a bending phenomenon is severe due to the aesthetic problem of the TPU base film, that is, the smoothness problem of the film due to a flow indentation mark. Accordingly, the film is not suitable for display applications requiring optical properties.

In the case of the current display cover glass of the smartphone, the surface tension is lowered by further strengthening the fluorine treatment on the surface of the cover glass in order to implement the anti-contamination and anti-fingerprint effects. Accordingly, due to the inherent hardness and the repulsive elasticity of a polyester (PET) film and a film including a TPU material, even when an adhesive having a high adhesive force is used, a phenomenon in which a liquid-crystal-protective film is not continuously attached to two or four curved edge sides but is separated therefrom becomes serious.

DISCLOSURE

Technical Problem

Accordingly, an object of the present invention is to provide a protective film for displays, which satisfies optical requirements and which is attached to a curved portion at an edge thereof, so that a peeling phenomenon does not occur even after long-term use. The protective film prevents the breakage of glass due to impact and prevents scratches on the surface of the display from being formed in living. Indentation marks made by a stylus pen when writing with the stylus pen on the surface of a liquid-crystal-protective film on a cover glass are immediately restored. Accordingly, a smart device may be carried and writing may be performed thereon without concern while the as-new appearance of the smart device is maintained.

Technical Solution

In order to solve the above problems, in the present invention, a transparent coating layer, which satisfies a Shore A Hardness of 35A to 75A, a tensile strength of 0.25 to 1.5 kgf/mm$^2$, and elongation of 100 to 700% and which has a thickness of 50 to 500 μm, is manufactured so that a base film layer is not included and the transparent coating layer having excellent optical properties acts as a base film. Thereby, impact resistance is provided to prevent the breakage of a liquid crystal glass, and attachment is performed without peeling on a curved portion. A surface-protective coating layer is included in an upper portion of the transparent coating layer.

The surface-protective coating layer includes a self-restoring coating layer having a function of restoring scratches in living or a function of an anti-contamination coating layer.

A surface-protective adhesive film for protection until attachment to a smartphone cover glass is included in an upper portion of the surface-protective coating layer. An adhesive layer having excellent wettability is included in the lower portion of the transparent coating layer so that the transparent coating layer is easily attached to the surface of the cover glass without air bubbles. A release film for protecting the adhesive layer until the adhesive layer is attached to the cover glass of the smartphone is included.

Advantageous Effects

The protective film of the present invention is transparently attached to both flat and curved portions of a smartphone while maintaining the design of the curved shape thereof. Accordingly, the problem of glass breakage caused by impact is overcome, scratches on the surface and back are prevented, and restoration is ensured after writing on the front glass portion, thereby obtaining the effect of meeting the desires of consumers.

DESCRIPTION OF DRAWINGS

FIG. 1 is a cross-sectional view showing the structure of a protective film of the present invention;

FIGS. 2a and 2b are a view showing a manufacturing process of the present invention; and FIGS. 3a and 3b are a cross-sectional view of a mobile phone to which the protective film of the present invention is attached.

BEST MODE

The constitution and structure of the present invention will be described according to the manufacturing procedure below with reference to the accompanying FIG. 1.

<Transparent Coating Layer 10>

In the present invention, a base film is not included, but a transparent coating layer plays the role of a base layer. The transparent coating layer is a coating layer that has a Shore A Hardness of 35A to 75A, satisfies a tensile strength of 0.25 to 1.5 kgf/mm$^2$ and elongation of 100 to 700%, and has a thickness of 50 to 500 μm and a light transmittance of 90% or more.

The transparent coating layer enables attachment to be performed without peeling on a curved portion, imparts impact resistance to a surface-protective coating layer to thus absorb external impacts, and prevents breakage of a liquid crystal glass. Current models that use a separate stylus pen, such as the Galaxy Note series, have a function of immediately restoring the indentation marks made by the pen or preventing contamination.

The transparent coating layer includes 5 to 50 parts by weight of a polyurethane acrylate oligomer, 1 to 30 parts by weight of an acrylic monomer, 30 to 90 parts by weight of a non-functional urethane oligomer, and 0.1 to 5 parts by weight of a photoinitiator.

The acrylic monomer includes one or more among aliphatic (metha)acrylate such as methyl (metha)acrylate, ethyl (metha)acrylate, propyl (metha)acrylate, isopropyl (metha)acrylate, butyl (metha)acrylate, sec-butyl (metha)acrylate, isobutyl (metha)acrylate, 2-ethylbutyl (metha)acrylate, n-pentyl (metha)acrylate, hexyl (metha)acrylate, 2-ethylhexyl (metha)acrylate, heptyl (metha)acrylate, n-octyl (metha)acrylate, nonyl (metha)acrylate, dodecyl (metha)acrylate, 3-methylbutyl (metha)acrylate, isooctyl (metha)acrylate, lauryl (metha)acrylate, tridecyl (metha)acrylate, stearyl (metha)acrylate, isostearyl (metha)acrylate, neopentyl (metha)acrylate, hexadecyl (metha)acrylate, and isoamyl (metha)acrylate; alicyclic (metha)acrylate such as isobornyl (metha)acrylate, cyclohexyl (metha)acrylate, and tetrahydrofurfuryl (metha)acrylate; (metha)acrylate having an ether group, such as 3-methoxybutyl (metha)acrylate, 2-methoxyethyl (metha)acrylate, 3-methoxypropyl (metha)acrylate, 2-methoxybutyl (metha)acrylate, methoxypolyethyleneglycol acrylate having an added oxyethylene mole number in the range of 1 to 15, ethoxy-diethyleneglycol (metha)acrylate, and ethylcarbitol (metha)acrylate; (metha)acrylate having a hydroxyl group, such as 2-hydroxyethyl (metha)acrylate, 2-hydroxypropyl (metha)acrylate, and 4-hydroxybutyl (metha)acrylate; aromatic (metha)acrylate such as benzyl (metha)acrylate, benzyl (metha)acrylate, phenoxyethyl (metha)acrylate, phenoxy polyethyleneglycol acrylate, phenyl (metha)acrylate, and 2-hydroxy-3-phenoxypropyl (metha)acrylate; (metha)acrylamide, dimethyl (metha)acrylamide, acryloyl morpholine, dimethylaminopropyl(metha)acrylamide, isopropyl(metha)acrylamide, diethyl(metha)acrylamide, hydroxyethyl(metha)acrylamide, and diacetone(metha)acrylamide.

A photoreaction initiator includes one or more among 2,2-dimethoxy-2-phenyl-acetophenone, 1-hydroxycyclohexyl phenyl ketone, benzaldehyde, anthraquinone, 3-methylacetophenone, 1-(4-isopropyl-phenol)-2-hydroxy-2-methylpropane-1-on, thioxanthone, 4-chlorobenzophenone, 4,4'-dimethoxybenzophenone, 4,4'-diaminobenzophenone, benzoin propyl ether, and benzoin ethyl ether.

The hardness of the transparent coating layer of the present invention is 35A to 75A. When the hardness is 35A or less, since the transparent coating layer is very soft, the restoring force is not ensured or significantly reduced after the external pressing, and the resistance to pressing becomes very weak. When the hardness is 75A or more, resistance to pressing is improved, but hardness is increased, causing a peeling phenomenon at the curved edge of the curved glass.

When the weight ratio of an acrylic monomer is increased to 30% or more, hardness is reduced to 35A or less, and the transparent coating layer is made soft. Accordingly, restoring force is not ensured, or is significantly reduced after external pressing, and resistance to pressing becomes very weak.

Further, when the content of the acrylic monomer is reduced below the above-described range, the restoring force and resistance to pressing are improved. However, since the hardness is increased to 75A or more, there is a fatal problem in that a peeling phenomenon occurs at the curved edge of the curved glass when the layer is attached to the curved edge after the manufacture of the finished product.

Preferably, the transparent coating layer of the protective film of the present invention has light transmittance of 90% or more, which is optical properties such as optical transparency and touch operability, and a thickness of 50 to 500 µm. When the thickness is 50 µm or less, impact resistance is reduced. When the thickness is 500 µm or more, since the thickness is very large, touch reaction is not smooth during the touch operation of the smartphone.

<Surface-Protective Coating Layer 20>

The surface-protective coating layer of the present invention includes a self-restoring coating layer or an anti-contamination layer.

The self-restoring coating layer has low hardness but excellent flexibility, elasticity, impact resistance, and self-restoration, thus being naturally restored without damage caused by external scratching. The self-restoring layer has compositions including a polyurethane oligomer and a polyester oligomer, and is manufactured by performing UV curing with a light amount of 300 to 1000 $mj/cm^2$ immediately after heat-curing a mixture including 30 to 55 parts by weight of the polyurethane oligomer, 30 to 60 parts by weight of isocyanate, 1 to 5 parts by weight of a polyfunctional acrylic monomer, such as trimethylolpropane triacrylate and hexanediol diacrylate, and 1 to 5 parts by weight of 1-hydroxycyclohexyl phenyl ketone, which is a photoreaction initiator based on 100 parts by weight of the polyester oligomer. When polyfunctional monomers, such as trimethylolpropane triacrylate and hexanediol diacrylate, and photoreactive monomers, such as 1-hydroxycyclohexyl phenyl ketone, which is a photoreaction initiator, are heat-cured without photo-reaction, the restoration of the pressed indentation mark may be reduced. Therefore, when the heat curing and UV curing are performed in the same manner as described above, the internal crosslinking density is further increased. Accordingly, restoration elasticity becomes excellent and restoration of the pressed indentation mark is significantly increased. Further, the thickness of the self-restoring coating layer must be 5 to 30 µm after curing in the manufacture. When the thickness of the coating layer is 5 µm or less, the self-restoration characteristic is reduced. When the thickness of the coating layer is 30 µm or more, since the curing time is long, productivity is reduced.

A coat obtained using a scratch-self-healing coating agent according to the present invention is very transparent and has strong elasticity. The coat may be restored within a short time due to elasticity when scratches are formed on the surface of the coating layer due to external factors, and is restored even when severe scratches are formed.

The anti-contamination coating layer is obtained by photocuring a compound including 10 to 20 parts by weight of a urethane oligomer, 10 to 30 parts by weight of trimethylolpropane triacrylate and 20 to 40 parts by weight of perfluoropolyether acrylate as polyfunctional acrylate monomers, and 3 to 10 parts by weight of 1-hydroxycyclohexyl phenyl ketone, which is a photoinitiator, and provides anti-contamination and slipperiness properties to the surface of the protective film. Thin film coating is performed so that a thickness is 0.1 to 3 µm. When the thickness of this coating layer is very large, since a peeling phenomenon may occur on the curved portion, the thin film coating is performed so that a thickness is 3 µm or less.

The anti-contamination-coating agent of the present invention imparts scratch resistance, anti-contamination, and slipperiness effects.

<Protective Film Layer 30>

Due to the structural characteristic of the liquid-crystal-protective film, after a release film is removed, the liquid-crystal-protective film is attached to the cover glass of the smartphone and a protective film is then removed, thereby achieving attachment. In the case where the protective film is removed during this process, if the liquid-crystal-protective film is separated from the smartphone without being attached thereto, it is very difficult for the end consumer to completely attach the liquid-crystal-protective film cleanly. The protective film is manufactured by performing first color printing on the cross-section of a PET base film, which has a thickness of 38 to 100 μm and which is treated with urethane on both surfaces thereof in order to distinguish the release film therefrom, and then applying a silicone adhesive layer on the printing surface or the opposite side thereof.

The adhesive used in the adhesive layer is laminated with a surface coating layer, and a silicone adhesive needs to be used in consideration of time-dependent variability of the adhesive force. In this case, a mixture of low-adhesion fluorinated silicone and a silicone release agent is included. For example, an adhesive layer, which includes 5 to 20 parts by weight of a crosslinking agent, 0.1 to 2 parts by weight of a platinum catalyst, and 0.1 to 5 parts by weight of a silane-coupling-based anchorage agent based on 100 parts by weight of a mixture solution including to 90 parts by weight of low-adhesion fluorinated silicone and 10 to 50 parts by weight of a polysilicone release agent and which has a crosslinking density of 60% or more, a coating layer thickness of 2 to 10 μm, and an adhesive force of 1 to 5 gf/in is formed. When the adhesive force of the protective film is high, in a process of removing the release film of the liquid crystal film, attaching the liquid crystal film to the glass of the smartphone, and removing the protective film, it may be difficult to remove the protective film from the present product that includes the surface coating layer, the transparent coating layer, and the adhesive layer due to the high adhesive force of the protective film.

Therefore, the adhesive force of the silicone adhesive layer of the protective film having the above-described composition is adjusted so that there is no adhesive force.

<Adhesive Layer 40>

As the adhesive used in the adhesive layer 40 formed on the lower portion of the transparent coating layer 10, an acrylic adhesive or a silicone adhesive may be applied. The thickness of the adhesive layer is 3 to 30 μm, and the adhesive force is adjusted to 5 to 700 gf/in.

Adhesive Layer-1: Acrylic Adhesive Layer

The composition of the adhesive layer for maintaining stable adhesive force even after use over a long period of time without peeling of the curved edge includes a solution-polymerization-type adhesive that is capable of being subjected to heat-curing and photoreaction-curing. That is, the adhesive layer is manufactured by performing UV curing with a light amount of 300 to 1000 mj/cm$^2$ immediately after heat-curing 0.5 to 2.0 parts by weight of a metal alkylate curing agent, 1 to 5 parts by weight of a polyfunctional acrylic monomer such as trimethylolpropane triacrylate and hexanediol diacrylate, and 1 to 5 parts by weight of 1-hydroxycyclohexyl phenyl ketone, which is a photoreaction initiator, based on 100 parts by weight of an acrylic copolymer obtained by performing solution polymerization using 2-hexylethyl acrylate, butyl acrylate, vinyl acetate, and acrylic acid 2-hydroxyethyl methacrylate. When polyfunctional acrylic monomers, such as trimethylolpropane triacrylate and hexanediol diacrylate, and photoreactive monomers, such as 1-hydroxycyclohexyl phenyl ketone, which is a photoreaction initiator, are heat-cured without photoreaction, restoration of the pressed indentation mark may be reduced. Therefore, when heat curing and UV curing are performed in the same manner as described above, internal crosslinking density is further increased. Accordingly, restoration elasticity becomes excellent and restoration of the pressed indentation mark is significantly increased.

Further, the thickness of the acrylic adhesive layer is 3 to 30 μm, and adjustment to 5 to 700 gf/in is performed in consideration of re-delamination after attachment according to the characteristics of the product.

Adhesive Layer-2: Silicone Adhesive Layer

The silicone adhesive includes a silicone-based adhesive composition including 5 to 20 parts by weight of a polydimethylsiloxane-based high-adhesion silicone adhesive, to 90 parts by weight of low-adhesion fluorinated silicone, 1 to 10 parts by weight of a crosslinking agent, 0.1 to 2 parts by weight of a platinum catalyst, and 0.1 to parts by weight of a silane-coupling-based anchorage agent.

The thickness of the silicone adhesive layer is 3 to 30 μm, and the adhesive force is adjusted to 5 to 700 gf/in by adjusting the ratio of the polydimethylsiloxane-based high-adhesion silicone adhesive and the low-adhesion fluorinated silicone adhesive in consideration of re-delamination after attachment according to the characteristics of the product.

One of the important characteristics of the present invention is that perfume having, for example, a fruit flavor, a coffee flavor, or a herbal flavor, may be used in an amount of 0.5 to 3 parts by weight based on 100 parts by weight of the resin of each layer of a surface-protective coating layer, a transparent coating layer, and an adhesive layer.

Since the display protective film is always used in the hands of the customer due to the characteristic of the displays, perfume may be added in order to always maintain a fresh feeling in use starting from the time of attachment to the curved glass of the display.

<Release Film 50>

The characteristic of the release film 50 is also an important part of the constitution of the present invention.

The release film 50 is first removed by the end consumer and then attached to the cover glass of the smartphone. In the delamination of the release film 50, if the protective film is first removed, it is difficult to complete the attachment procedure. Accordingly, the delamination force of the release film must be sufficiently small. The delamination force of the release film is 1 to 10 gf/in, and preferably 1 to 5 gf/in.

Finally, the most important characteristic of the product of the present invention is that the product does not include the base of the conventional PET film or TPU film but includes a transparent coating layer as a non-base type. A peeling phenomenon does not occur on the curved edge of the curved display, and the product has a self-restoration function for external scratches, an anti-contamination function, an impact resistance function, and a restoration function for indentation marks made by a stylus pen due to a surface-protective coating layer.

<Manufacturing Method>

The manufacturing method of the present invention includes first to third processes according to the manufacturing procedure. In the first process, a coating liquid for a transparent coating layer 200a having a viscosity of 50 to 2000 cPs at room temperature is applied to a thickness of 100 to 500 μm through a filter on a first release film 100a having a thickness of 50 μm using a pump after a defoaming process for removing air bubbles, and is then laminated with a second release film 300a having a thickness of 50 μm. With respect to UV curing conditions, photocuring is performed under a light amount of 300 to 1000 mj/cm$^2$ in a UV-curing zone 400a at a wavelength of 254 to 450 nm, thus manufacturing semi-finished transparent coating layer products 500a having a thickness of 50 to 500 μm (FIG. 2A).

In the second process, the release film on one side of the semi-finished transparent coating layer products 100 manufactured using the above-described process is removed using a delamination device 200. A self-restoring layer or an anti-contamination layer, which is a surface protective layer, is directly applied to a thickness of 5 to 30 μm on the transparent coating layer using a microgravure coating device 300. When the self-restoring layer is applied, a coating agent is applied to a thickness of 5 to 30 μm on the transparent coating layer so that a viscosity is 10 to 500 cPs, and is then subjected to heat-curing and photocuring in a dry zone 400 at a temperature of 60 to 150° C. for 1 to 3 minutes using a UV-curing device 500, thereby achieving drying and curing (FIG. 2B).

When the anti-contamination layer containing a fluorine compound is applied instead of the self-restoring layer, photocuring is performed using the UV-curing device 500 (FIG. 2B).

In the third process, the release film attached to the transparent coating layer of the product, which is manufactured through the above-described process and which includes the transparent coating layer and the surface-protective coating layer, is removed. The adhesive is dried and then applied to a thickness of 3 to 30 μm, and heat-drying and photocuring were performed, followed by lamination with the release film having a thickness of 19 to 75 μm using a second unwinder 700 (FIG. 2B).

MODE FOR INVENTION

To evaluate the physical properties of the present invention, samples were manufactured, compared, and evaluated as follows.

A protective film and a release film are removed in the process of attaching a liquid-crystal protective film to the glass of a smartphone, so only the pure product layer, from which the protective film and the release film were removed, was used to perform the following test evaluation.

Example 1

A medium-adhesive product which is manufactured using the following composition and manufacturing method of each layer of the present invention, which includes a self-restoring layer of 5 to 30 μm, a transparent coating layer of 100 to 500 μm, and an acrylic adhesive coating layer of 3 to 30 μm, and which has an adhesive force of 50 to 300 gf/in.

Self-restoring-surface-protective coating layer: The self-restoring-surface-protective coating layer has compositions including a polyurethane oligomer and a polyester oligomer, is manufactured by performing UV curing with a light amount of 300 to 1000 mj/cm² immediately after heat-curing a mixture including 30 to 55 parts by weight of the polyurethane oligomer, 30 to 60 parts by weight of isocyanate, 1 to 5 parts by weight of a polyfunctional acrylic monomer, such as trimethylolpropane triacrylate and hexanediol diacrylate as acrylic monomers, and 1 to 5 parts by weight of 1-hydroxycyclohexyl phenyl ketone, which is a photoreaction initiator, based on 100 parts by weight of the polyester oligomer, and includes a coating layer having a thickness of 30 μm.

Transparent coating layer: The transparent coating layer is a coating layer on the lower surface of the self-restoring coating layer, includes 5 to 50 parts by weight of a polyurethane acrylate oligomer, 1 to 30 parts by weight of an acrylic monomer, 30 to 90 parts by weight of a UV-nonreactive resin, and 0.1 to 5 parts by weight of a photoinitiator, satisfies a Shore A Hardness of 35A to 75A, a tensile strength of 0.25 to 1.5 kgf/mm², and elongation of 100 to 700%, and has a thickness of 50 to 500 μm.

Acrylic adhesive layer: The acrylic adhesive layer is an acryl-based adhesive layer on the lower surface of the transparent coating layer, and is manufactured by performing UV curing with a light amount of 300 to 1000 mj/cm² immediately after heat-curing 0.5 to 2.0 parts by weight of a metal alkylate curing agent, 1 to 5 parts by weight of a polyfunctional acrylic monomer such as trimethylolpropane triacrylate and hexanediol diacrylate, and 1 to 5 parts by weight of 1-hydroxycyclohexyl phenyl ketone, which is a photoreaction initiator, based on 100 parts by weight of an acrylic copolymer, obtained by performing solution polymerization using 2-hexylethyl acrylate, butyl acrylate, vinyl acetate, and acrylic acid 2-hydroxyethyl methacrylate, so that a thickness is 3 to 30 μm.

Example 2

A medium-adhesive product which is manufactured using the following composition and manufacturing method of each layer of the present invention, which includes an anti-contamination surface-protective coating layer of 0.1 to 3 μm, a transparent coating layer of 100 to 500 μm, and an acrylic adhesive coating layer of 3 to 30 μm, and which has an adhesive force of 50 to 300 gf/in.

The anti-contamination surface-protective coating layer is obtained by photocuring a compound including 10 to 20 parts by weight of a urethane oligomer, 10 to 30 parts by weight of trimethylolpropane triacrylate and 20 to 40 parts by weight of perfluoropolyether acrylate as acrylic monomers, and 3 to 10 parts by weight of 1-hydroxycyclohexyl phenyl ketone which is a photoinitiator, and imparts anti-contamination and slipperiness properties to the surface of the protective film. Thin film coating is performed so that a thickness is 0.1 to 3 μm.

Transparent coating layer: The transparent coating layer is a coating layer on the lower surface of the self-restoring coating layer, includes 5 to 50 parts by weight of a polyurethane acrylate oligomer, 1 to 30 parts by weight of an acrylic monomer, 30 to 90 parts by weight of a UV-nonreactive resin, and 0.1 to 5 parts by weight of a photoinitiator, satisfies a Shore A Hardness of 35A to 75A, a tensile strength of 0.25 to 1.5 kgf/mm², and elongation of 100 to 700%, and has a thickness of 50 to 500 μm.

Acrylic adhesive layer: The acrylic adhesive layer is an acryl-based adhesive layer on the lower surface of the transparent coating layer, and is manufactured by performing UV curing with a light amount of 300 to 1000 mj/cm² immediately after heat-curing 0.5 to 2.0 parts by weight of a metal alkylate curing agent, 1 to 5 parts by weight of a polyfunctional acrylic monomer such as trimethylolpropane triacrylate and hexanediol diacrylate, and 1 to 5 parts by weight of 1-hydroxycyclohexyl phenyl ketone, which is a photoreaction initiator, based on 100 parts by weight of an acrylic copolymer obtained by performing solution polymerization using 2-hexylethyl acrylate, butyl acrylate, vinyl acetate, and acrylic acid 2-hydroxyethyl methacrylate, so that a thickness is 3 to 30 μm.

Example 3

A medium-adhesive product which is manufactured using the following composition and manufacturing method of each layer of the present invention, which includes a self-restoring layer of 5 to 30 μm, a transparent coating layer of 100 to 500 µm, and a silicone adhesive coating layer of 3 to 30 µm on the surface thereof, and which has an adhesive force of 5 to 300 gf/in.

Self-restoration-surface-coating layer: The self-restoring-surface-coating layer has compositions including a polyurethane oligomer and a polyester oligomer, is manufactured by performing UV curing with a light amount of 300 to 1000 mj/cm$^2$ immediately after heat-curing a mixture including 30 to 55 parts by weight of the polyurethane oligomer, 30 to 60 parts by weight of isocyanate, 1 to 5 parts by weight of a polyfunctional acrylic monomer, such as trimethylolpropane triacrylate and hexanediol diacrylate, and 1 to 5 parts by weight of 1-hydroxycyclohexyl phenyl ketone, which is a photoreaction initiator, based on 100 parts by weight of the polyester oligomer, and includes a coating layer having a thickness of 30 µm.

Transparent coating layer: The transparent coating layer is a coating layer on the lower surface of the self-restoring coating layer, includes 5 to 50 parts by weight of a polyurethane acrylate oligomer, 1 to 30 parts by weight of an acrylic monomer, 30 to 90 parts by weight of a UV-nonreactive resin, and 0.1 to 5 parts by weight of a photoinitiator, satisfies a Shore A Hardness of 35A to 75A, a tensile strength of 0.25 to 1.5 kgf/mm$^2$, and elongation of 100 to 700%, and has a thickness of 50 to 500 µm.

Silicone adhesive layer: The silicone adhesive layer is a silicone-based adhesive layer on the lower surface of the transparent coating layer, and includes compositions which include 5 to 20 parts by weight of a polydimethylsiloxane-based high-adhesion silicone adhesive and 0.1 to 5 parts by weight of a silicone-based adhesive, including 70 to 90 parts by weight of low-adhesion fluorinated silicone, 1 to 10 parts by weight of a crosslinking agent, 0.1 to 2 parts by weight of a platinum catalyst, and 0.1 to 5 parts by weight of a silane-coupling-based anchorage agent. The thickness thereof is 3 to 30 µm. The adhesive force thereof is adjusted to 5 to 700 gf/in by adjusting the ratio of the polydimethylsiloxane-based high-adhesion silicone adhesive and the low-adhesion fluorinated silicone adhesive.

As Comparative Examples, a commercially available liquid-crystal-protective film was purchased to perform comparative tests through structural analysis.

Comparative Example 1

A low-adhesive product which includes a hard coating of 2 to 3 µm, a PET base film of 100 to 200 µm, and a silicone adhesive layer of 20 to 30 µm in the lamination order from the surface thereof and which has an adhesive force of 5 to 10 gf/in.

Comparative Example 2

A medium-adhesive product which includes a hard coating of 2 to 3 µm, a PET base film of 100 to 200 µm, and a silicone adhesive layer of 20 to 30 µm in the lamination order from the surface thereof and which has an adhesive force of 150 to 300 gf/in.

Comparative Example 3

A product formed by heating and pressing a medium-adhesive product which includes a hard coating of 2 to 3 µm, a PET base film of 100 to 200 µm, and a silicone adhesive layer of 30 µm in the lamination order from the surface thereof and which has an adhesive force of 150 to 300 gf/in.

Comparative Example 4

A medium-adhesive product which includes a TPU base film of 100 to 200 µm and a silicone adhesive layer of 30 µm sequentially from the surface thereof and which has an adhesive force of 150 to 300 gf/in.

Comparative Example 5

A medium-adhesive product which includes a surface coating of 1 to 5 µm, an acryl resin coating of 60 to 80 µm, a PET base film of 23 to 25 µm, and a silicone adhesive layer of 20 to 30 µm sequentially from the surface thereof and which has an adhesive force of 150 to 300 gf/in.

Test Example 1

Each protective film of Examples and Comparative Examples was attached to the front surface including the curved edge of the glass of Samsung's Galaxy S7 edge, as shown in FIG. 3A. In FIG. 3A, a liquid-crystal-protective film a was attached to the front glass b having the curved edge of the main body c of a smartphone. The liquid-crystal-protective film a was attached so as to cover both a flat portion 1-1 and a curved edge 1-2.

After the attachment, physical properties were evaluated, and the results are set forth in the following Table 1.

TABLE 1

| Evaluation item | Example 1 | Example 2 | Example 3 | Comparative Example 1 | Comparative Example 2 | Comparative Example 3 | Comparative Example 4 | Comparative Example 5 | Test standard |
|---|---|---|---|---|---|---|---|---|---|
| Peeling phenomenon on curved edge of glass | No peeling | No peeling | No peeling | Peeling | Peeling | Peeling | Peeling | Peeling | Note 1) |
| Impact resistance test | No glass breakage | No glass breakage | No glass breakage | Glass breakage | Glass breakage | Glass breakage | No glass breakage | No glass breakage | Note 2) |
| Surface scratch | Instant restoration | No scratch | Instant restoration | No scratch | No scratch | No scratch | Scratched | Scratched | Note 3) |
| Test of pressed indentation | Instant restoration | Instant restoration | Slightly slow restoration | No pressed indentation | No pressed indentation | No pressed indentation | Pressed indentation marks | Pressed indentation marks | Note 4) |

TABLE 1-continued

| Evaluation item | Example 1 | Example 2 | Example 3 | Comparative Example 1 | Comparative Example 2 | Comparative Example 3 | Comparative Example 4 | Comparative Example 5 | Test standard |
|---|---|---|---|---|---|---|---|---|---|
| marks when writing using stylus pen | | | speed in writing | marks | marks | marks | were not restored | were not restored | |
| Water contact angle of surface coating layer | 95~100° | 100~110° | 95~100° | 100~110° | 100~110° | 100~110° | 95~100° | 95~100° | Note 5) |

Test Example 2

Each protective film of Examples and Comparative Examples was attached to the front surface including the curved edge of the glass of Apple's iPhone 7 as shown in FIG. 3B. In FIG. 3B, the liquid-crystal-protective film a was attached to the front glass b having a curved edge in a main body c of a smartphone. The liquid-crystal-protective film a was attached so as to cover both a flat portion 1-1 and a curved edge 1-2.

Physical properties were evaluated after the attachment, and the results are described in the following Table 2.

TABLE 2

| Evaluation item | Example 1 | Example 2 | Example 3 | Comparative Example 1 | Comparative Example 2 | Comparative Example 3 | Comparative Example 4 | Comparative Example 5 | Test standard |
|---|---|---|---|---|---|---|---|---|---|
| Peeling phenomenon on curved edge of glass | No peeling | No peeling | No peeling | Peeling | Peeling | Peeling | Peeling | Peeling | Note 1) |
| Impact resistance test | No glass breakage | No glass breakage | No glass breakage | Glass breakage | Glass breakage | Glass breakage | No glass breakage | No glass breakage | Note 2) |
| Surface scratching | Instant restoration | Not scratched | Instant restoration | Not scratched | Not scratched | Not scratched | Scratched | Scratched | Note 3) |
| Test of pressed indentation marks when writing using stylus pen | Instant restoration | Instant restoration | Slightly slow restoration speed in writing | No pressed indentation marks | No pressed indentation marks | No pressed indentation marks | Pressed indentation marks were not restored | Pressed indentation marks were not restored | Note 4) |
| Water contact angle of surface coating layer | 95~100° | 100~110° | 95~100° | 100~110° | 100~110° | 100~110° | 95~100° | 95~100° | Note 5) |

Note 1)
After attachment to the front glass of the smartphone and being left at 70° C. for 72 hours and then room temperature for 1 hour, a peeling phenomenon was observed on the curved edge.
Note 2)
After attachment of each film to the glass of the smartphone, a 120 g weight was dropped freely from a 150 cm height in order to test for breakage of the glass.
Note 3)
Surface scratch occurrence and scratch restoration were observed on the surface layer of the film using a copper brush
Note 4)
After writing with a strong force on the surface layer of the film using a stylus pen, indentation marks made due to writing were observed
Note 5)
The water contact angle for each part of the surface layer of the film was measured and the range of the measurement result was recorded As can be seen from the evaluation of the physical properties after the attachment to the front surfaces including the curved edges of two types of smartphones having different R values at the curved edge thereof (for products other than the protective film and the release film, only the product actually attached to the smartphone is described), in Example 1 of the present invention, there was no peeling phenomenon even after an environmental condition test with respect to the peeling phenomenon on the edge of the curved glass, and there was no glass breakage phenomenon even in an impact resistance condition test. Further, the surface was immediately restored even when scratches occurred in a surface scratch restoration test, and the surface was immediately restored in a pressed indentation mark test for writing using a stylus pen, showing excellent results of restoration.

In Example 2, there was no peeling phenomenon even after an environmental condition test with respect to the peeling phenomenon on the curved edge of the glass, and there was no glass breakage phenomenon even in an impact resistance condition test. In the case of the surface scratch test, scratches were not observed in Comparative Example 1, unlike in Comparative Example 3. Since the water contact angle was 100 to 110° due to the low surface tension, a slipperiness property was excellent, and the surface was immediately restored in a pressed indentation mark test for writing using a stylus pen, showing excellent results of restoration.

In the case of Example 3, there was no peeling phenomenon even after an environmental condition test with respect to the peeling phenomenon on the curved edge of the glass, as in Example 1, there was no glass breakage phenomenon in an impact resistance condition test, and the surface was immediately restored even when scratches occurred in a surface scratch restoration test. However, in a pressed indentation mark test for writing using a stylus pen, the surface was restored at a speed slightly slower than in Example 1.

In all of Comparative Examples 1 to 4, a peeling phenomenon occurred on the curved edge of the glass. In the case of the impact resistance test, the glass was not broken in Comparative Example 4, including a TPU film base, and in Comparative Example 5, including an acrylic resin including a PET film base.

In the case of a surface-layer-scratch-occurrence test, scratches were not observed on the surface in all of Comparative Examples 1 to 3. In the case of a pressed indentation mark test for writing using a stylus pen, indentation marks were not made by the stylus pen in Comparative Examples 1 to 3, including products that were subjected to hard coating surface treatment, and the indentation marks made by the stylus pen were not restored in Comparative Examples 4 and 5.

In conclusion, in Example 1, the most stable physical properties were maintained without a peeling phenomenon on the curved edge of the glass, and the best results were obtained in evaluation of other physical properties. In Example 2, the most stable physical properties were maintained without a peeling phenomenon on the curved edge of the glass, a smooth slipperiness property was ensured on the protective coating layer, and the best results were obtained in evaluation of other physical properties. In Example 3, relatively good results were obtained for the evaluation items of other physical properties, except that the restoration speed of the indentation marks made due to writing using a stylus pen was slightly slow.

DESCRIPTION OF REFERENCE NUMERALS

10: Transparent coating layer
20: Surface-protective coating layer
30: Protective film
40: Adhesive layer
50: Release film
100*a*: First unwinder (first release film)
200*a*: Transparent coating layer (UV-curable-coating agent)
300*a*: Second unwinder (second release film)
400*a*: UV-curing zone (UV zone)
500*a*: First semi-finished transparent coating products
100: First unwinder (base film or semi-finished products)
200: Delamination device (device for peeling laminated release film)
300: Coating head (device for applying a coating liquid to a certain thickness, microgravure)
400: Dry zone (drying and heat-curing device)
500: UV curing device
600: Rewinder (device for rewinding a coating film after drying and curing)
700: Second unwinder (device for performing lamination of a release film on a coating surface of a descending film dried and cured after coating)

The invention claimed is:

1. A display protective film comprising:
   a transparent coating layer, which includes 5 to 50 parts by weight of a polyurethane acrylate oligomer, 1 to 30 parts by weight of an acrylic monomer, 30 to 90 parts by weight of a UV-nonreactive resin, and 0.1 to 5 parts by weight of photoinitiator, which satisfies a Shore A Hardness of 35A to 75A, a tensile strength of 0.25 to 1.5 kgf/mm$^2$, and elongation of 100 to 700%, and which has a thickness of 50 to 500 μm and a light transmittance of 90% or more; and
   a surface-protective coating layer comprising a self-restoring layer, an anti-contamination coating layer, or both,
   wherein the self-restoring layer includes a coating layer having a thickness of 5 to 30 μm, obtained by heat-curing and UV curing 30 to 55 parts by weight of a polyurethane oligomer, 30 to 60 parts by weight of isocyanate, 1 to 5 parts by weight of a polyfunctional acrylic monomer, and 1 to 5 parts by weight of 1-hydroxycyclohexyl phenyl ketone, which is a photoreaction initiator, based on 100 parts by weight of a polyester oligomer, and
   wherein the anti-contamination coating layer is a coating layer having a thickness of 0.1 to 3 μm, obtained by photocuring a compound including 10 to 20 parts by weight of a urethane oligomer, 10 to 30 parts by weight of trimethylolpropane triacrylate, and 20 to 40 parts by weight of perfluoropolyether acrylate as polyfunctional acrylate monomers, and 3 to 10 parts by weight of 1-hydroxycyclohexyl phenyl ketone, which is a photoinitiator.

2. The display protective film of claim 1, wherein the surface-protective coating layer comprises the self-restoring layer and the anti-contamination coating layer.

3. The display protective film of claim 1, wherein the surface-protective coating layer comprises the self-restoring layer.

4. The display protective film of claim 1, wherein the surface-protective coating layer comprises the anti-contamination coating layer.

5. The display protective film of claim 1, further comprising:
   an acryl-based or silicone-based adhesive layer having an adhesive force of 5 to 700 gf/in and a thickness of 3 to 30 μm on a lower surface of the transparent coating layer.

6. The display protective film of claim 5, wherein the silicone-based adhesive layer includes a polydimethylsiloxane-based high-adhesion silicone adhesive and a low-adhesion fluorinated silicone adhesive.

7. The display protective film of claim 1, wherein the display protective film includes 0.5 to 3 parts by weight of perfume based on 100 parts by weight of the resin of each layer.

8. The display protective film of claim 1, wherein a PET film and a protective film, which includes low-adhesion fluorinated silicone, a silicone release agent, and an adhesive layer having an adhesive force of 1 to 5 gf/in are included in an upper portion of the surface-protective coating layer.

9. The display protective film of claim 5, further comprising:
 a release film having a delamination force of 1 to 10 gf/in in a lower portion of the adhesive layer.

10. The display protective film of claim 5, wherein the display protective film includes 0.5 to 3 parts by weight of perfume based on 100 parts by weight of the resin of each layer.

11. The display protective film of claim 6, wherein the display protective film includes 0.5 to 3 parts by weight of perfume based on 100 parts by weight of the resin of each layer.

* * * * *